(12) United States Patent
Obert et al.

(10) Patent No.: US 11,080,282 B2
(45) Date of Patent: Aug. 3, 2021

(54) COMPLEX FILTER QUERY OF MULTIPLE DATA SETS

(71) Applicant: SAP SE, Walldorf (DE)

(72) Inventors: Marius Obert, Walldorf (DE); Johan Raffin, Walldorf (DE); Claudia Lehmann, Walldorf (DE); Phil Tinari, Walldorf (DE); Kimberly Starks, Walldorf (DE); Jeffery Woody, Walldorf (DE); Xin Wen, Walldorf (DE)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 16/150,124

(22) Filed: Oct. 2, 2018

(65) Prior Publication Data
US 2020/0104400 A1   Apr. 2, 2020

(51) Int. Cl.
*G06F 16/2457* (2019.01)
*G06F 16/248* (2019.01)
*G06F 16/22* (2019.01)
*G06F 16/2458* (2019.01)

(52) U.S. Cl.
CPC ...... *G06F 16/2457* (2019.01); *G06F 16/2246* (2019.01); *G06F 16/248* (2019.01); *G06F 16/2471* (2019.01)

(58) Field of Classification Search
CPC ............. G06F 16/2457; G06F 16/2471; G06F 16/2246; G06F 16/248
See application file for complete search history.

(56) References Cited

U.S. PATENT DOCUMENTS

| | | | | |
|---|---|---|---|---|
| 2004/0158481 A1* | 8/2004 | Gennaro | ................ | G06Q 30/02 705/7.34 |
| 2014/0188845 A1* | 7/2014 | Ah-Soon | ................ | G06F 16/256 707/722 |
| 2016/0217218 A1* | 7/2016 | Hong | ................ | G06Q 10/06 |

(Continued)

OTHER PUBLICATIONS

Excel-Easy, Advanced Filter in Excel, archived atarchive.org on Jun. 6, 2017; https://web.archive.org/web/20170606111616/https://www.excel-easy.com/examples/advanced-filter.html. (Year: 2017).*

(Continued)

*Primary Examiner* — Jay A Morrison
(74) *Attorney, Agent, or Firm* — Fountainhead Law Group P.C.

(57) ABSTRACT

In one embodiment, a complex query includes components that are arranged in a hierarchical structure including a first type of filter and a second type of filter and are connected by connectors. The method selects a first data set and selects a second data set for the components. The second data set being generated by processing data in the first data set for the second type of filter and the second data set includes entries describing a result of the processing. The first type of filter is applied to the first data set and the second type of filter to the second data set for the components where the information describing the result is used by the second type of filter to filter entries and first type of filter filters entries based on column values in the first data set. The method combines outputs of the components using the connectors.

20 Claims, 8 Drawing Sheets

(56) References Cited

U.S. PATENT DOCUMENTS

2019/0370406 A1* 12/2019 Bose .................... G06F 3/0629
2020/0050695 A1*  2/2020 Benjamin ........... G06F 16/9535

OTHER PUBLICATIONS

Techotopia, Advanced MySQL Data Filtering—And, or, not and in, archived atarchive.org on Jun. 1, 2017; https://web.archive.org/web/20170601171558/https://www.techotopia.com/index.php/Advanced_MySQL_Data_Filtering_-_AND,_OR,_NOT_and_IN. (Year: 2017).*

* cited by examiner

COMPLEX FILTER QUERY OF MULTIPLE DATA SETS

BACKGROUND

A software application, such as a data preparation application, allows analysts to discover, prepare, and share local and enterprise datasets. Further, the software application redefines information governance, usage monitoring, and preparation automation for information technology.

Initially, the analysts import datasets into the software application. Before using the datasets, the analysts create a project and import the dataset into a worksheet. A project is a collection of worksheets that can be created by one user and shared with other users. Then, the datasets can be filtered according to various criteria to identify relevant records and to have a fine, granular view on desired data.

An analyst may need to check the data quality of the worksheet regularly to ensure that the data conforms to the defined quality standards. The software application may offer different features to assess the data quality. For example, one approach checks the values of each column. Those checks may be simple comparisons, such as checking if a value is equal to or greater than another value or not equal to or greater than another value. Because of the simple structure, these filters are called flat filters. The analyst may filter the worksheet by as many flat filters as desired. If more than one flat filter is applied, the flat filters are additively applied to each other, which results in a conjunction of the flat filters. One problem with this behavior is that this analysis is limited to identify bad records by only checking a value of columns. Some data quality criteria may be represented by a composition of a conjunction of many flat column filters, but other criteria are too complex to be analyzed by just those flat filters.

DETAILED DESCRIPTION

Figure 1:
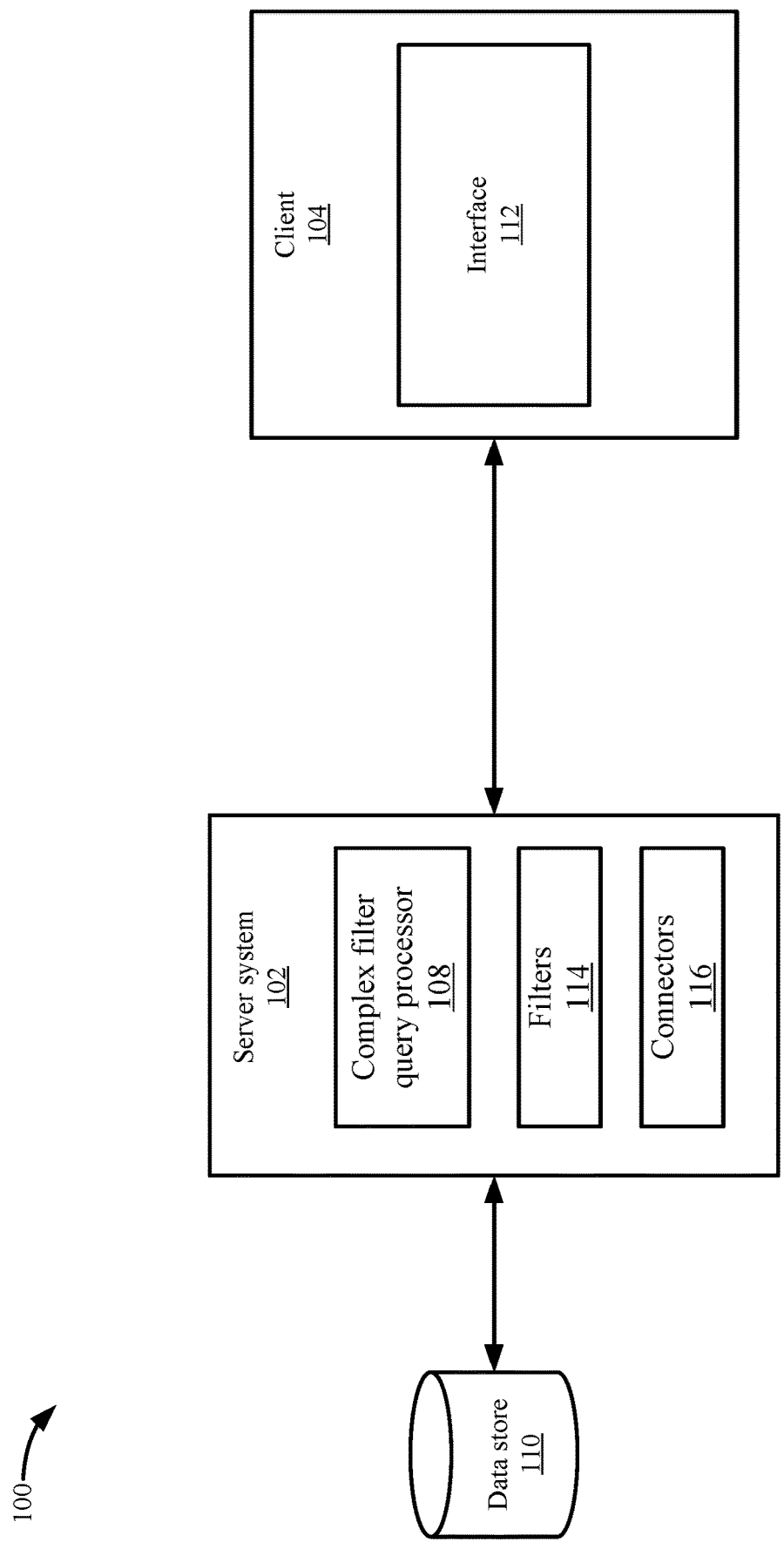
FIG. 1 depicts a simplified system of a method for processing complex filter queries according to some embodiments.

Described herein are techniques for a complex filter processing system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments allow a user to generate a complex filter query, which may be a query that includes multiple different types of connectors, such as an "AND" connector, an "OR" connector, or "XOR" connector. In some embodiments, the filters found in the complex query may be flat filters that filter based on column values. The complex query may allow a user to filter data records at a finer granularity than just using one type of connector. However, even though the complex filter query allows different types of connectors, a user may still not be able to analyze a dataset for all the types of data quality checks that are desired when limited to flat filters that filter based on column values.

Some embodiments provide additional types of filters, referred to as complex filters, other than the flat filters that filter based on some type of criteria on values that are not found in the original columns. For example, a first type of complex filter may be based on the semantic meeting of column values and a second type of complex filter may be based on pre-defined rule outcomes. Although these complex filters are described, other types of filters that filter based on data other than the column values in the original dataset may be appreciated. For example, a complex filter based on a functional dependency may be used where a user can filter records that violate the functional dependency.

The complex filters based on the semantic meeting of the column values may be referred to as a cleanse filter and may be based on a previous operation that analyzed the column values based on a criterion, such as a previous cleanse operation. The cleanse filter may check if a cell value (of one or more columns) is found to be expected, suspect, or valid. The cleanse filter is defined by the detected entity type (e.g., an address, person, or material data), the filter operator (e.g., valid, suspect, significant changes, or blank), and possibly additional parameters depending on the operator. The complex filters based on pre-defined rule outcomes may be called a rule filter that may be used to check if cell values (of one or more columns) are compliant with a pre-defined rule. Such rules can be used to model corporate guidelines or regulations to which every record in the dataset should comply. The rule filter may be defined by a rule that needs to be applied to the column values and the expected outcome (e.g., pass or fail).

To allow the addition of these different types of complex filters to the complex filter query, some embodiments process the original dataset using engines that can generate additional datasets. The additional datasets may be stored in tables and may include additional columns that include values based on a criterion that was applied to column values in the original dataset. The values in the additional datasets may be different from the original column values, but are values based on applying the criterion to the column values. For example, the output for a cleanse filter may be based on a value, such as suspect or valid. The output for the rule filter may be based on an outcome of applying a rule, such as a value of pass or fail.

Previously, when generating a query with only one type of connector, a user can easily understand the components of the query as they are added sequentially. However, when generating a complex query, the components of the query may be added in different hierarchical locations. Further, the user may add complex filters to flat filters in the query. Some embodiments provide a hierarchical visualization of the query to allow a user to more efficiently generate the complex query. The user can more easily manipulate and insert components in the query using the hierarchical visualization. Further, the user can see which components are complex filters and flat filters. This improves the user interface by making the components of the query clearer to the user and allows a user to generate a complex filter query more efficiently.

Once the complex filter query is generated, a query processor then receives the complex filter query and determines which datasets to query. Then, the query processor can generate query results by combining the information from the original dataset and the additional datasets.

System Overview

FIG. 1 depicts a simplified system 100 of a method for processing complex filter queries according to some embodiments. System 100 includes a server system 102, a client 104, and a data store 110. Although one instance of server system 102, client 104, and data store 110 are shown, it will be understood that multiple instances may be appreciated.

Client 104 may be used by a user to view a worksheet, which may be a view of data within a dataset that is stored in data store 110. A dataset can be a database table or a database view in a local database or in a remote data source, a worksheet in a spreadsheet file, a comma-separated value (CSV) file, an extensible markup language (XML) file, or a data dump from a data source. The worksheet may include columns that each include a number of entries or cells. The entries or cells include values from the dataset in data store 110. The user may use an interface 112 to perform operations on the worksheet, such as checking the data quality of the data in the worksheet using filters. For example, the user may input a complex filter query using interface 112. The complex filter query may include one or more filters 114 and multiple types of connectors 116.

Filters 114 may include different types of filters. A first type of filter may be referred to as a flat filter, which may check a value of a column. For example, a flat filter may check the value based on a comparator, such as checking whether a value is equal to or not equal to a value. Each flat filter may be defined by a number of properties, such as the three properties of a column identifier (ID) (e.g., a name), a comparator, and reference values. A comparator may be different operators that can operate on a value, such as equals, not equals, in list, not in list, between, not between, greater than, greater than or equals to, less than, less than or equals to, match pattern, different from pattern, is null, is not null, in look-up column, and not in look-up column. The flat filters may be based on a single comparator that may be applied to values in the column of the original dataset that are compared to one or more reference values of the column. For example, the comparator "not in look up column" indicates if a cell value is or is not a member of a pre-defined list of valid reference values.

Another type of filter may be a complex filter that filters based on processing of values in the column. The processing generates one or more additional datasets that include values not found in the original column values. One example of a complex filter is a cleanse filter that is based on a semantic meaning of the column values of the original dataset. The semantic meeting may be automatically identified by an engine, such as a cleanse engine. For example, the cleanse engine performs a cleanse operation on a dataset that analyzes cell values of one or more columns, and determines the semantic meeting of the values, such as whether a cell value is found to be expected, suspect, or valid based on a profile entity type. In some examples, the cleanse engine checks an address format to determine if the address format is as expected, suspect, or valid based on a reference value. The cleanse filter may be defined by the detected entity type, such as the entity type may be an address, person, or material data, the filter operator (valid, suspect, significant changes, or blank), and possible additional parameters depending on the operator. The result of the cleanse operation may indicate whether corresponding column values are valid, suspect, etc. The results are then stored in a new table. Given that the cleanse engine generates new data, the cleanse filter is not based on filtering the original data, but rather filtering based on the new data. Additional tables to store the new data in which the cleanse filter may be applied may be stored in data store 110.

One example of a cleanse operation may be to cleanse an address entity. The address before may be "2323 Grand Bolavard", "Floor 6", "KANSAS CITY", "MO", "64108", "US" with each entry in a different column. After the cleanse operation, the data may be "2323Grand Blvd. Fl 6", "Kansas City", "MO", "64108", "United States". The cleanse operation may change the original data, such as correcting the street name of "Grand Bolavard" to "Grand Blvd", adding the floor number to the street address, removing all caps "KANSAS CITY", and spelling out "US" to "United States". Additionally, the cleanse operation may associate information for certain entries as valid, suspect, etc. In this case, the valid operator may be associated with the entries because they conform to the cleanse criteria.

Another type of complex filter is a rule filter that is based on pre-defined rule outcomes. The rule filter may check if cell values of one or more columns are compliant with a pre-defined rule. A rule engine executes rules on the cell values of columns of the original dataset and generates new data, such as information on whether or not the values passed or failed the rule. The rule filter may be defined by the rule that is applied and the expected outcome (e.g., pass or fail). Given that the rules are applied to the cell values of the original dataset and generate new data, a new table in data store 110 is generated that stores the result of the expected outcome for each column value, such as pass or fail.

One example of a rule may determine if a Company column includes a value that is not empty. The rule operation analyzes column values to determine if the values are not equal to Null. The entries that are equal to Null may be flagged as failed.

Some embodiments provide different types of connectors 116. For example, connectors 116 may include AND (e.g., conjunction), OR (e.g., disjunction), XOR (exclusive OR) connectors. The connectors connect different types of filters together.

A complex filter query may include multiple different types of connectors 116. For example, a complex filter query may include an AND connector and an OR connector. The complex filter query is different from a query that only includes one type: of connector, such as only AND connectors. The complex filter query allows a user to generate more complicated queries, such as complex queries that perform ifthen checks. For example, a user may check if a field "customer type" has a value of "OnlineCustomer", then the entity type <Address> has to be valid". These checks may be nested arbitrarily. For example, the complex query "If the field <CustomerType> does not contain the value "OnlineCustomer", then <another criteria> has to be fulfilled". These checks may be enabled using multiple types of connectors and cannot be performed using only one type of connector. For example, only AND connectors cannot perform the if-then check above. Rather, a query of "CustomerType"='OnlineCustomer' OR <another criteria> is needed.

To provide a better, more understandable view of the complex filter query, the filters may be arranged in a hierarchical structure, such as a tree structure; however, other hierarchical structures may be used. In a complex filter query, multiple filters are leaves of a tree and a root is a connector 116. In between the leaves and the root can be any number of given filters and connectors. The complex filter query may allow users to identify more records that meet criteria defined by the complex filter query. Additionally, the use of a complex filter query allows the use of the additional types of complex filters with the flat filters.

A complex filter query processor 108 can perform the query to data store 110. The addition of using the complex filters may cause a query to data store 110 to operate differently compared with if only flat filters are used. As will be discussed in more detail below, data store 110 may include multiple tables that store the original dataset for the worksheet and additional datasets that are generated for the complex filters. The generation of the complex query may also be different from using only flat filters. The complex filter query may include hierarchical structure and the complex query is generated to represent that hierarchical structure.

After generating the complex query, complex filter query processor 108 may filter the worksheet using data from the original dataset and data from the additional datasets to perform the complex filter query. Complex filter query processor 108 can then generate query results and return the query results to interface 112.

Query Processing

Figure 2:
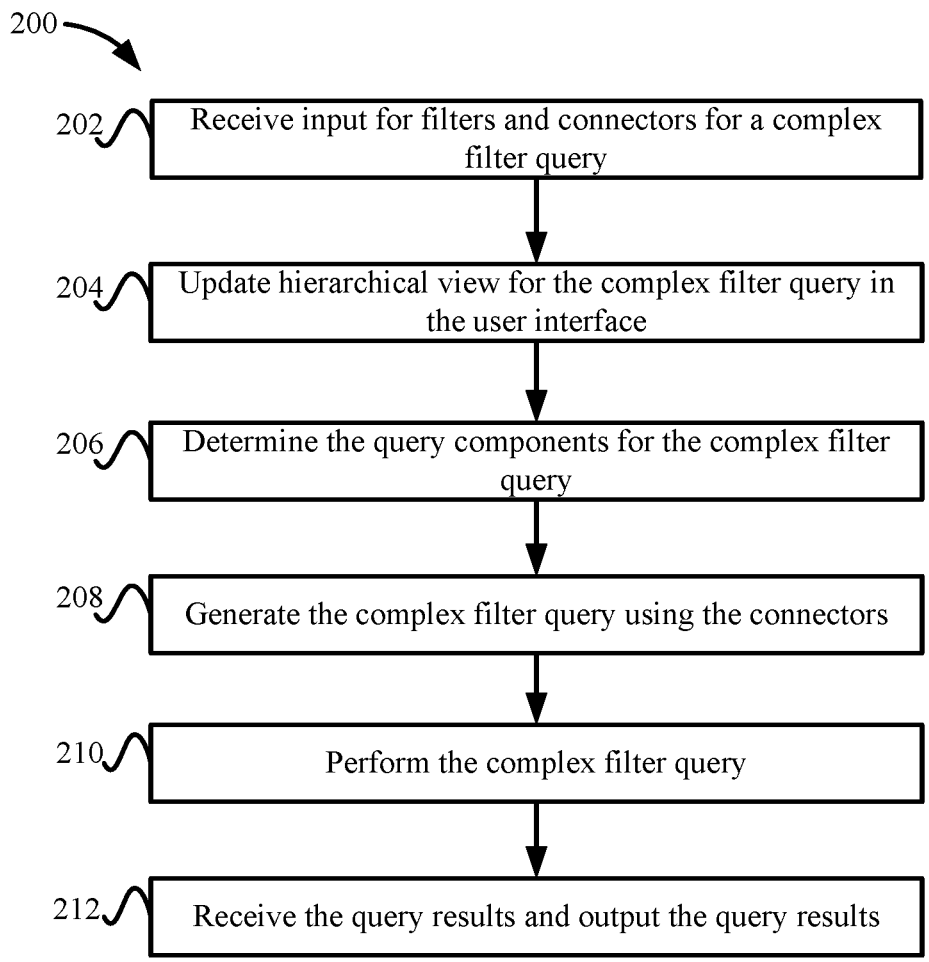
FIG. 2 depicts a simplified flowchart of a method for processing a complex filter query according to some embodiments.
Figure 3:
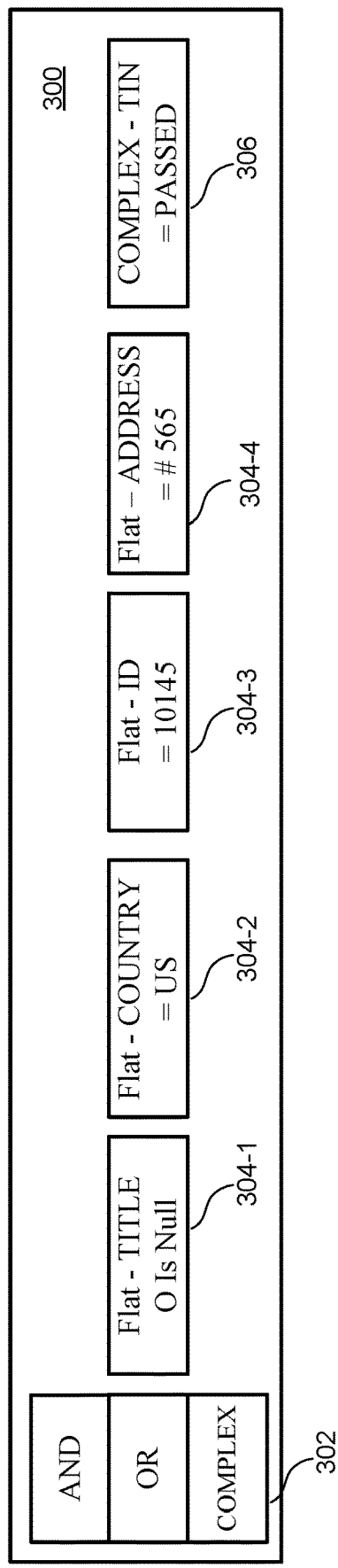
FIG. 3 depicts an example of a filter bar that can be used to modify the complex filter query according to some embodiments.

FIG. 2 depicts a simplified flowchart 200 of a method for processing a complex filter query according to some embodiments. At 202, complex filter query processor 108 receives input for filters 114 and connectors 116 for a complex filter query. A user may use a tool in interface 112 to generate a complex filter query. For example, FIG. 3 depicts an example of a filter bar 300 that can be used to modify the complex filter query according to some embodiments. Filter bar 300 includes a filter type input 302 where a user can specify the type of filter, such as a simple filter of only "AND" connectors or only "OR" connectors. Also, complex filters may be selected that may include multiple types of the "AND" and "OR" connectors.

A user has created a query and filter bar 300 displays the components of the query without connectors. For example, filter bar 300 also includes multiple flat filters 304-1 to 304-4. The flat filters may identify a column, such as a TITLE column, and also a comparator, such as "IsNull". TITLE is the identifier for the column and IsNull is testing whether a column value is Null or not. Additional flat filters 304-2, 304-3, and 304-4 may also identify the column by column ID and the comparator.

A complex filter is shown at 306. This example shows a rule filter that identifies the entity type of "tin" and a criterion, such as "Passed Records".

Figure 4:
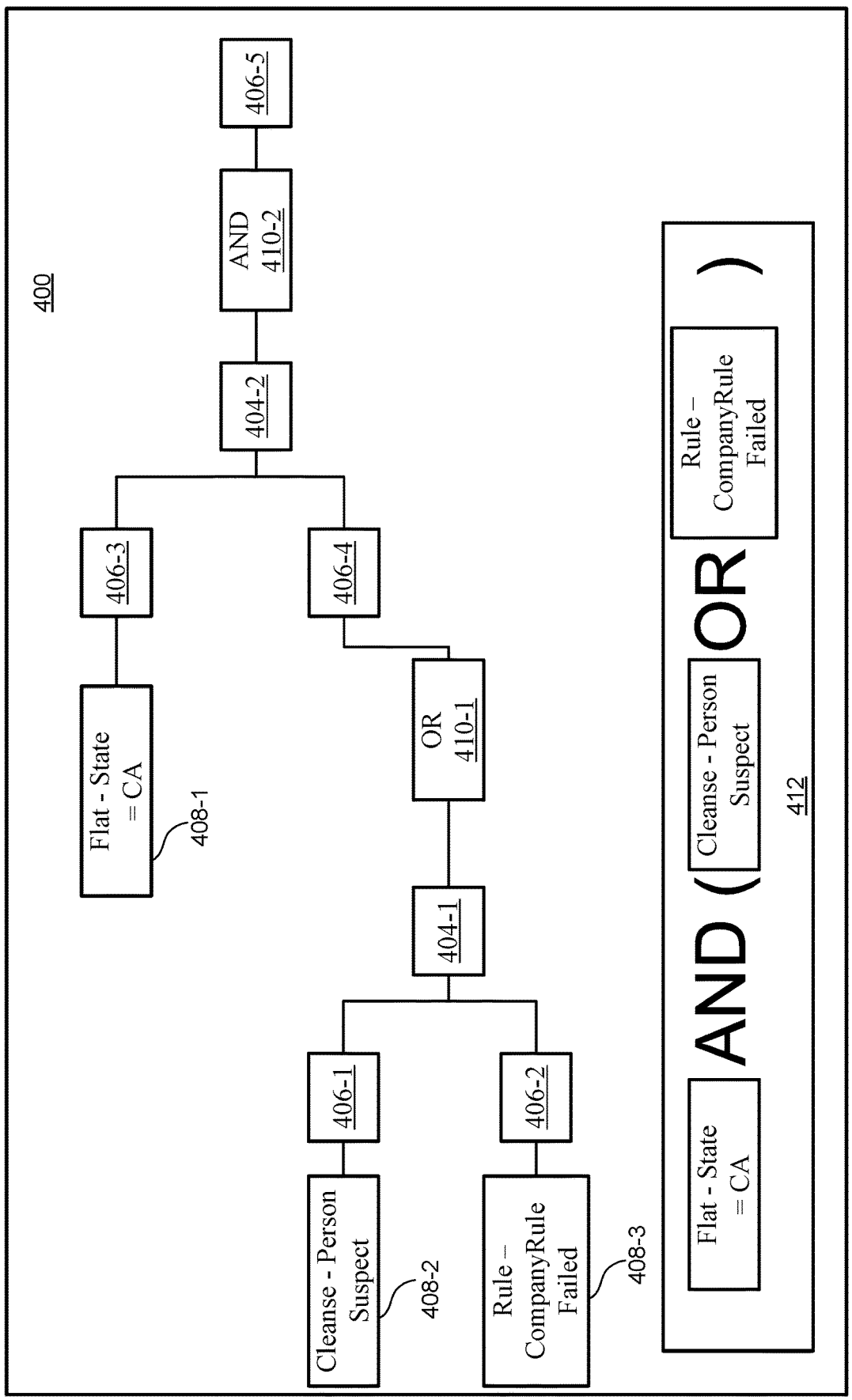
FIG. 4 depicts an example of a filter tree according to some embodiments.

Filter bar 300 visualizes the filter data structure as a flat bar control, which represents the filter tree as an expression statement. The entities in filter bar 300 may also be represented in user interface 112 as a hierarchical structure, such as a filter tree. FIG. 4 depicts an example of a filter tree 400 according to some embodiments. Filter tree 400 visually shows the filter hierarchy in the complex filter query and may also allow selections of the entities in filter tree 400 as well as drag-and-drop operations to manipulate filter tree 400. Because the complex filter is being generated, unlike a filter with only one type of connector where filters may be added at the end of the filter, a user may add filters in different locations in the hierarchy of the complex filter query. Accordingly, the hierarchical view of filter tree improves the user interface for the user when generating the complex filter query.

All nodes of filter tree 400 may include a type of filter, such as a flat filter or complex filter. The nodes may be draggable to allow filter tree 400 to be edited easily. Filter tree 400 also includes some functional nodes to perform edit operations, such as insert new filter, replace filter, or fork this node into two sub-branches. The insert new filter operator inserts either a flat filter or a complex filter, the replace filter operator replaces an existing filter, and the fork this node creates two sub-branches. Functional nodes are shown at 404-1 and 404-2 to allow the addition of leaf nodes. Additional functional nodes 406-1 to 406-5 allow the forking of the node into multiple branches.

In filter tree 400, a flat filter is shown at 408-1 that filters the column "State" by a comparative value of ="CA" (California). Also, a cleanse filter at 408-2 filters for an entity type of "Person" for the filter operator of "Suspect". The cleanse operation determines for a column of Person whether the values are suspect or valid. The cleanse filter finds values in an additional data structure that have a suspect entry value for corresponding column values in the original data set. This would filter out entries that have valid entry values. Additionally, if the original data was corrected, the corrected data may be displayed from the additional data sets.

A rule filter at 408-3 defines a rule to apply of "CompanyRule" with an expected outcome of "failed records". This rule determines whether or not the rule applied to the values of a column failed or passed. The rule complex filter retrieves the values that failed the rule CompanyRule.

The result of the cleanse filter and the rule filter is then connected by an "OR" connector at 410-1. The output of the "OR" connector is a branch along with the output of the flat filter at 408-1. The "AND" connector at 410-2 combines the output of the flat filter at 408-1 and the "OR" filter at 410-2. The output of the "AND" connector 116-2 is the output of the complex filter query.

Filter tree 400 may be represented by a flat structure in a query shown at 412. The flat structure shows the query in a string form rather than a hierarchical tree. The flat structure may represent the hierarchical structure of the query using connectors and the groupings of filters (e.g., parenthesis). In some cases, visualizing the complex filter query using filter tree structure 400 may be easier for a user to edit the query and also visualize the components of the query. For example, using the functional nodes of filter tree 400 are easier for a user to insert filters in the complex filter query compared to inserting the filters in the flat structure. Additionally, editing the query using filter tree structure 400 may also be easier for a user because drag-and-drop operations may be more naturally performed on filter tree structure 400.

Also, as the complexity of a complex filter query increases, the usefulness of displaying filter tree structure 400 in user interface 112 increases. This provides a user interface that is improved over a user interface that only shows the flat structure for the filter. For example, a user may better understand the hierarchical structure of the filter tree visually. Additionally, the complex filters are more easily identified in the complex filter. The user interface may make it easier to isolate parts of a hierarchical tree structure that must be true rather than analyzing one long statement. A query may only run some arbitrary rules only if the cleanse engine determined the record was not valid. For example, the query might include an extremely large complex filter that is: "<This is a valid record> OR <an extremely long complex filter>". In the tree structure, a user could immediately see that if the record was considered valid by the cleanse engine (e.g., this is a valid record is true), then the whole statement is true. But in one long statement, the user would have to analyze the parenthesis structure to make sure this is true.

Referring back to FIG. 2, at 204, as inputs to generate the complex filter query are received, complex filter query processor 108 updates the hierarchical view for the complex filter query in user interface 112. When the user is finished with the complex filter query, complex filter query processor 108 determines the query components for the complex filter query. The query components may summarize the nodes of the complex filter query. Then, at 208, complex filter query processor 108 generates the complex filter query by combining the components using the connectors specified. The hierarchy of the connectors in complex filter tree 400 are used to generate the complex filter query.

At 210, complex filter query processor 108 performs the complex filter query with data store 110. As will be described in more detail below, complex filter query processor 108 may query multiple data tables based on the components of the complex filter query. At 212, complex filter query processor 108 receives the query results and outputs the query results on interface 112.

Query Processing

Figure 5A:
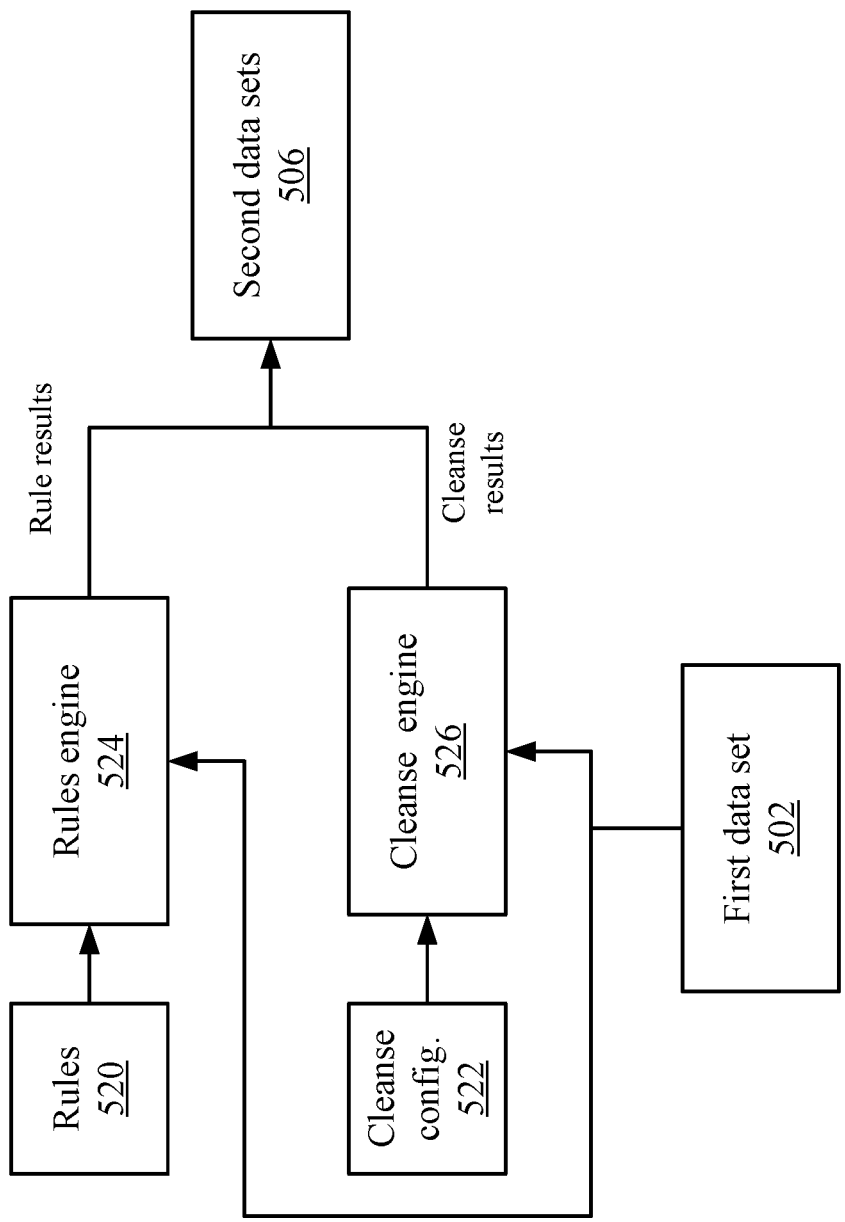
FIG. 5A depicts a more detailed example of the processing of a data store according to some embodiments.

FIG. 5A depicts a more detailed example of the processing of data store 110 according to some embodiments. Data store 110 stores an original data set as first data set 502.

A rules engine 524 receives rules 520 that define rules to apply to the original data set. Rules engine 524 retrieves data from first data set 502 and applies the rules to the data to generate rule results. The rule results may include new values that represent the rule outcomes.

A cleanse engine 524 receives a cleanse configuration 522 that define cleanse operations to apply to the original dataset. Cleanse engine 526 retrieves data from first data set 502 and applies the cleanse operations to the data to generate cleanse results. The cleanse results include new values that include a result of the cleanse operation. Additionally, if the format of the data in first data set 502 is changed, the new data is generated. The rule results and cleanse results are stored in second data sets 506.

Data store 110 may include a first dataset 502, which may be the original dataset in which a worksheet is generated. The new datasets may be based on different complex filters, such as the cleanse filter and the rule filter described above. Because the cleanse filter and the rule filter are filtered based on a criterion instead of a column value, second datasets 506 are generated to store data that can be filtered based on the criteria. For example, a second dataset 506 is stored for a cleanse filter that stores the entity type from column values of first data set 504 and a filter operator for each value associated with the entity type. Also, second data set 506 stores data for a rule filter that defines a column for cell values that include the value for the outcome of the rule.

Figure 5B:
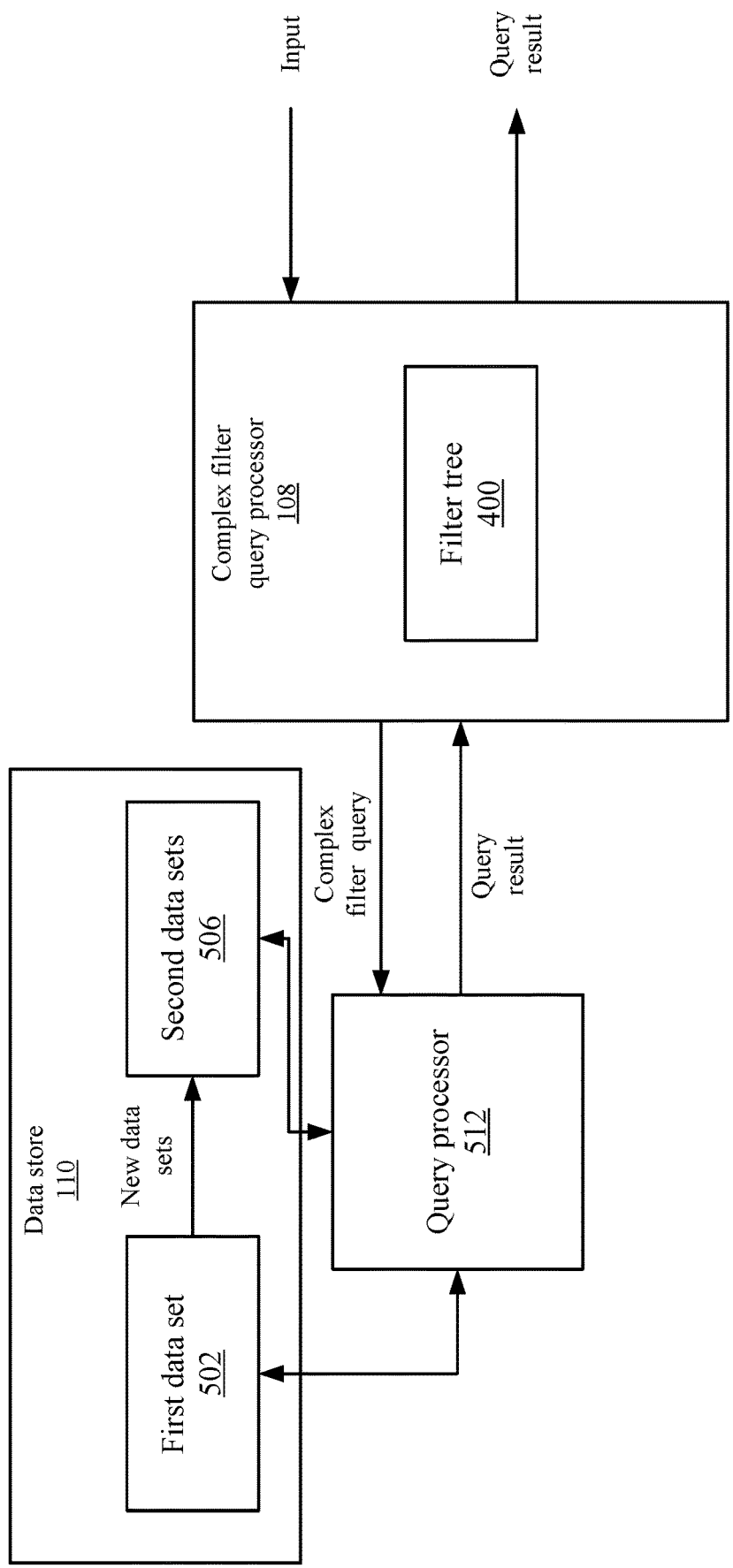
FIG. 5B shows the query process according to some embodiments.

It is noted that the rule results and cleanse results can be generated before a query is received or upon receiving a query. Upon receiving the query, FIG. 5B shows the query process according to some embodiments. Complex filter query processor 108 receives input from a user via user interface 112. Then, complex filter query processor 108 determines a filter tree 400. Complex filter query processor 108 then uses filter tree 400 to generate a complex filter query for data store 110. For example, complex filter query processor 108 may generate the query shown at 412 in FIG. 4.

A query processor 512 associated with data store 110 receives the complex filter query and is configured to query datasets in data store 110, which may include first dataset 502 and second datasets 506. For example, query processor 512 may analyze the components of the complex filter query to determine which datasets to access. Depending on the type of filter used in the complex filter query, query processor 512 determines which dataset to access.

Query processor 512 receives the result of the query for different components from first dataset 502 and second datasets 506. Query processor 512 can then combine the results using the connectors used in the complex filter query. Query processor 512 can then return a query result to complex filter query processor 108. Complex filter query processor 108 may then display the query result on interface 112.

Figure 6:
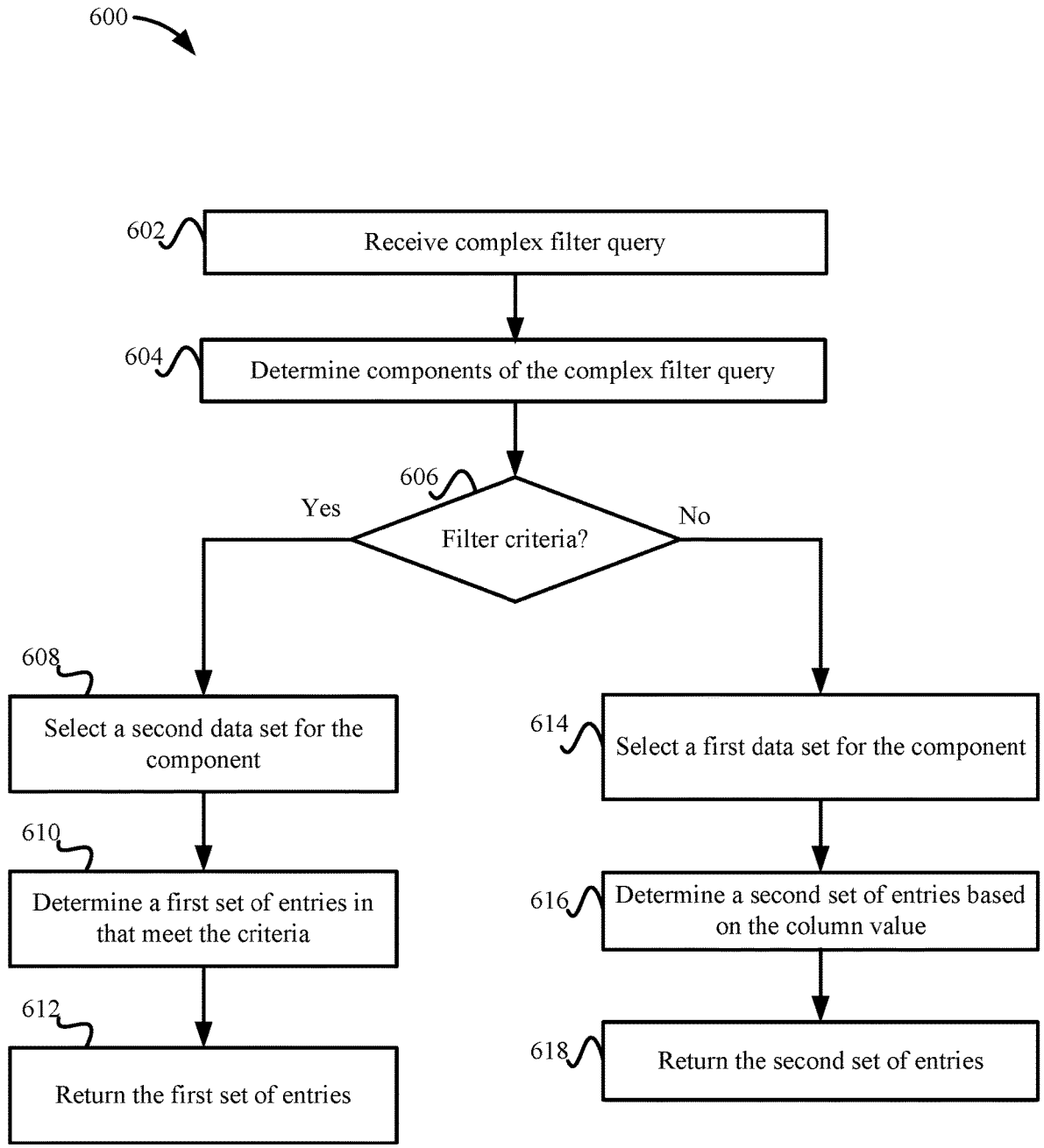
FIG. 6 depicts a simplified flowchart of a method for processing the complex filter query at a query processor according to some embodiments.

FIG. 6 depicts a simplified flowchart 600 of a method for processing the complex filter query at query processor 512 according to some embodiments. At 602, query processor 512 receives the complex filter query. At 604, query processor 512 determines the components of the complex filter query. Then, at 606, complex filter query processor 108 determines if there is a filter criterion specified for the component. The filter criterion may be associated with a complex query and does not analyze column values. Whereas, a flat filter may be associated with a comparator that is associated with a column value.

If a filter criterion is associated with a component, at 608, query processor 512 selects a second dataset for the component. For example, the second dataset may be associated with some type of processing that was applied to column values. At 610, query processor 512 determines a first set of entries that meet the criteria. For example, cell values from the first data set that may meet the criteria as "suspect" may be determined. In other examples, all cell values from the first data set that may meet the rule of an expected outcome of "pass" may be determined. Then, at 612, query processor 512 returns the first set of entries.

At 614, if the component does not include a filter criterion, at 614, query processor 512 selects a first dataset for the component. The first dataset may be part of the original dataset. At 616, query processor 512 determines a second set of entries based on the column value. For example, the column values may be compared to a comparator in the component. Then, at 618, query processor 512 returns the second set of entries. The above process may be performed for each component of the complex filter query.

Conclusion

Accordingly, some embodiments combine complex filters with flat filters in a complex filter query. The complex filters may allow multiple types of connectors to be used. This provides the user with a more powerful set of tools to determine the data quality of a worksheet. Further, use of the complex filter queries allows an even further granularity to be filtered from the dataset. This requires some processing of the original dataset to generate additional datasets. While additional storage may be used, the query results may be enhanced from using the additional datasets. The combination of the complex filters and the generation of a complex filter query extends the options for analyzing the dataset.

Also, the use of a complex filter tree allows a user to visualize the complex filter query in a clearer manner.

Because the complex filter tree includes multiple types of connectors, it is harder for a user to visualize the components and how the components connect compared to if only one connector is used. The display of the complex filter query in a complex filter tree may improve the clarity of the user interface by showing the hierarchy to the user visually.

System

Figure 7:
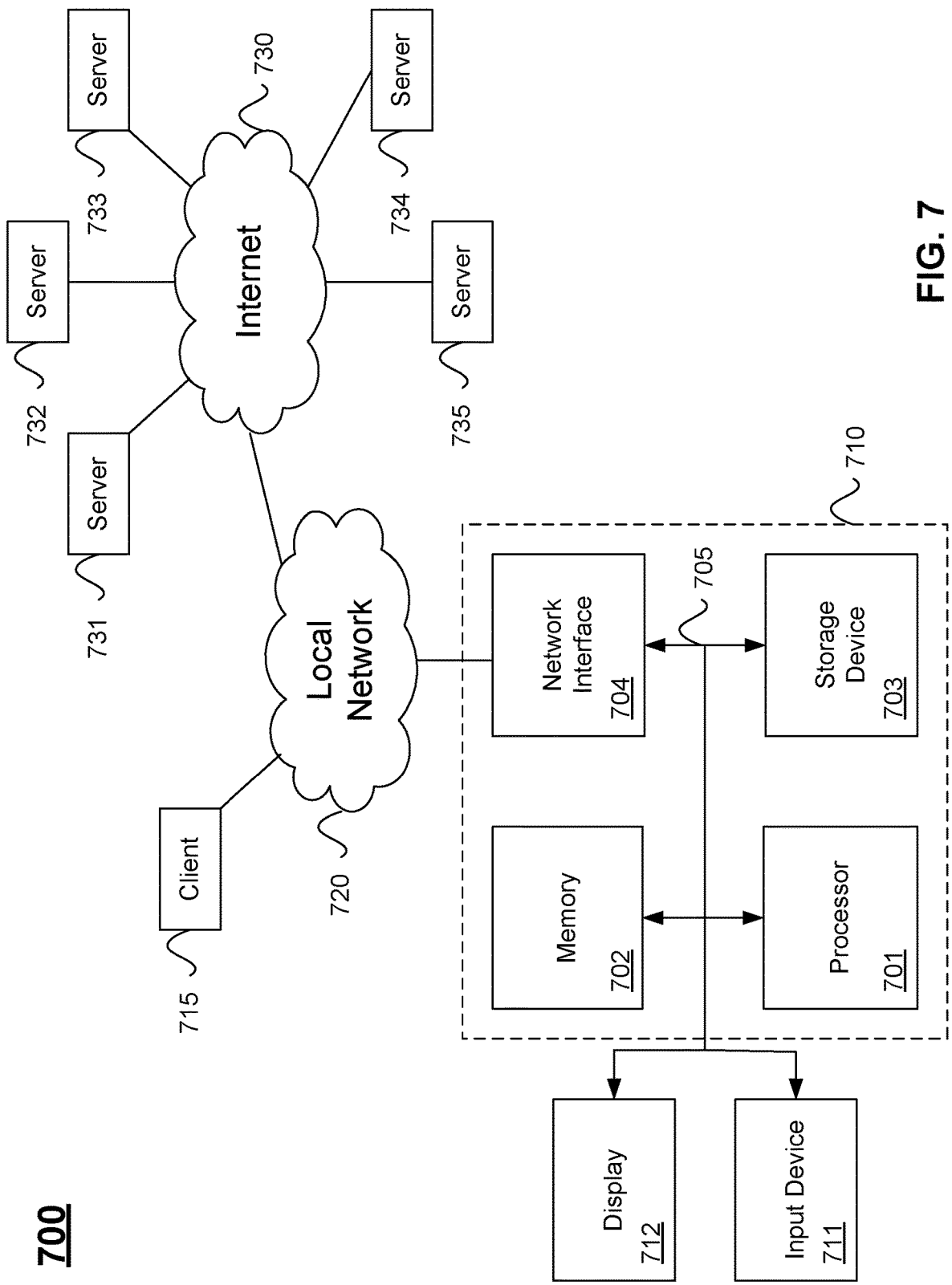
FIG. 7 illustrates hardware of a special purpose computing machine configured with a server system according to one embodiment.

FIG. 7 illustrates hardware of a special purpose computing machine configured with server system 102 according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by the computing device, input for a complex query for a worksheet of entries, the complex query including components that are arranged in a hierarchical structure including a first type of filter and a second type of filter and are connected by a plurality of types of connectors;
    processing, by the computing device, the complex query, wherein processing the complex query performs:
    generating, based on the second type of filter, a second data set by processing a first data set, the second data set including outcomes from processing the first data set, the outcomes not appearing in the first data set,
    selecting first data from the first data set and selecting second data from the second data set for the components,
    applying the first type of filter to the first data set and the second type of filter to the second data set for the components, wherein the outcomes are used by the second type of filter to filter entries in the worksheet and first type of filter filters entries in the worksheet based on column values in the first data set, and
    combining outputs of the components using the plurality of types of connectors.

2. The method of claim 1, wherein processing data in the first data set to generate the second data set comprises:
    performing an operation on the first data set to generate the second data set, the second data set including information for a criteria in which the second type of filter can filter.

3. The method of claim 1, wherein the plurality of types of connectors comprises at least two of a first connector that performs an AND operation, a second connector that performs an OR operation, and a third connector that performs an XOR operation.

4. The method of claim 1, wherein the first type of filter comprises a flat filter that filters data in the first data set based on a column value.

5. The method of claim 1, wherein the second type of filter filters based on a semantic meaning of column values.

6. The method of claim 1, wherein the second type of filter comprises a cleanse filter that is defined by a detected entity type in the first data set and a cleanse filter operator based on the result of processing the first data set.

7. The method of claim 1, wherein the second type of filter comprises a pre-defined rule outcome of processing the first data set.

8. The method of claim 1, wherein the second type of filter comprises a rule filter that is defined by a rule that is applied to data in the first data set and an expected outcome of processing the first data set.

9. The method of claim 1, further comprising:
outputting a user interface based on the input, the user interface displaying the complex query visually in the hierarchical structure.

10. The method of claim 9, wherein the hierarchical structure comprises a hierarchical tree structure.

11. The method of claim 10, further comprising:
displaying a flat version of the complex query in the user interface with the hierarchical tree structure.

12. The method of claim 1, wherein outputting the user interface comprises:
displaying multiple filters including at least one of the first type of filter and at least one of the second type of filter, wherein the multiple filters are connected by the first type of connector and the second type of connector.

13. The method of claim 1, wherein the user interface includes a node to branch the node into two sub-branches.

14. The method of claim 1, wherein the complex query includes the first type of filter or the second type of filter as leaf nodes and a connector in the plurality of connectors as a root node.

15. The method of claim 1, wherein applying the second type of filter comprises:
determining a column in the second data set for the second type of filter;
determining a filter criteria for the second type of filter; and
selecting entries in the first data set that correspond to entries in the column that meet the filter criteria.

16. The method of claim 1, wherein applying the first type of filter comprises:
determining a column in the first data set for the first type of filter;
determining a comparator for the first type of filter; and
selecting entries in the column that include values that meet the comparator.

17. A non-transitory computer-readable storage medium containing instructions, that when executed, control a computer system to be configured for:
receiving input for a complex query for a worksheet of entries, the complex query including components that are arranged in a hierarchical structure including a first type of filter and a second type of filter and are connected by a plurality of types of connectors;
processing the complex query, wherein processing the complex query performs:
generating, based on the second type of filter, a second data set by processing a first data set, the second data set including outcomes from processing the first data, the outcomes not appearing in the first data set,
selecting first data from the first data set and selecting second data from the second data set for the components,
applying the first type of filter to the first data set and the second type of filter to the second data set for the components, wherein the outcomes are used by the second type of filter to filter entries in the worksheet and first type of filter filters entries in the worksheet based on column values in the first data set, and
combining outputs of the components using the plurality of types of connectors.

18. The non-transitory computer-readable storage medium of claim 17, wherein processing data in the first data set to generate the second data set comprises:
performing an operation on the first data set to generate the second data set, the second data set including information for a criteria in which the second type of filter can filter.

19. The non-transitory computer-readable storage medium of claim 17, wherein applying the second type of filter comprises:
determining a column in the second data set for the second type of filter;
determining a filter criteria for the second type of filter; and
selecting entries in the first data set that correspond to entries in the column that meet the filter criteria.

20. An apparatus comprising:
one or more computer processors; and
a non-transitory computer-readable storage medium comprising instructions, that when executed, control the one or more computer processors to be configured for:
receiving input for a complex query for a worksheet of entries, the complex query including components that are arranged in a hierarchical structure including a first type of filter and a second type of filter and are connected by a plurality of types of connectors;
processing the complex query, wherein processing the complex query performs:
generating, based on the second type of filter, a second data set by processing a first data set, the second data set including outcomes from processing the first data set, the outcomes not appearing in the first data set,
selecting first data from the first data set and selecting second data from the second data set for the components,
applying the first type of filter to the first data and the second type of filter to the second data for the components, wherein the outcomes are used by the second type of filter to filter entries in the worksheet and first type of filter filters entries in the worksheet based on column values in the first data set, and
combining outputs of the components using the plurality of types of connectors.

* * * * *